US008418578B2

(12) United States Patent
Armitage

(10) Patent No.: US 8,418,578 B2
(45) Date of Patent: Apr. 16, 2013

(54) ADJUSTABLE SHIFT LEVER ASSEMBLY FOR A TRANSMISSION

(75) Inventor: Douglas P. Armitage, Knoxville, TN (US)

(73) Assignee: Tremec Corp., Plymouth, MI (US)

( * ) Notice: Subject to any disclaimer, the term of this patent is extended or adjusted under 35 U.S.C. 154(b) by 610 days.

(21) Appl. No.: 12/354,502

(22) Filed: Jan. 15, 2009

(65) Prior Publication Data

US 2009/0178505 A1 Jul. 16, 2009

Related U.S. Application Data

(60) Provisional application No. 61/011,162, filed on Jan. 15, 2008.

(51) Int. Cl.
*F16H 59/04* (2006.01)
(52) U.S. Cl.
USPC ........................................ 74/473.35
(58) Field of Classification Search ............... 74/473.3, 74/473.33, 473.34, 473.35, 471 XY
See application file for complete search history.

(56) References Cited

U.S. PATENT DOCUMENTS

| 4,287,780 | A | * | 9/1981 | Poling ........................ 74/100.2 |
| 4,333,360 | A | | 6/1982 | Simmons |
| 4,569,245 | A | | 2/1986 | Feldt et al. |
| 4,581,951 | A | | 4/1986 | Watson |
| 5,592,856 | A | | 1/1997 | Parsons |
| 5,907,975 | A | | 6/1999 | Giaimo |
| 2008/0115612 | A1 | * | 5/2008 | Kumagai et al. ............. 74/473.3 |

* cited by examiner

*Primary Examiner* — Phillip A Johnson
(74) *Attorney, Agent, or Firm* — MacMillan, Sobanski & Todd, LLC

(57) ABSTRACT

A shift lever assembly includes a shift tower and a shift lever supported on the shift tower for movement relative thereto. The shift lever includes a pin. A biasing lever is provided that has a first end and a second end. The second end of the biasing lever is engaged for movement with the pin. A biasing mechanism exerts a force against the first end of the biasing lever such that the second end of the biasing lever exerts a force against the pin. The biasing mechanism is adjustable such that the amount of force exerted by the second end of the biasing lever against the pin can be varied.

20 Claims, 4 Drawing Sheets

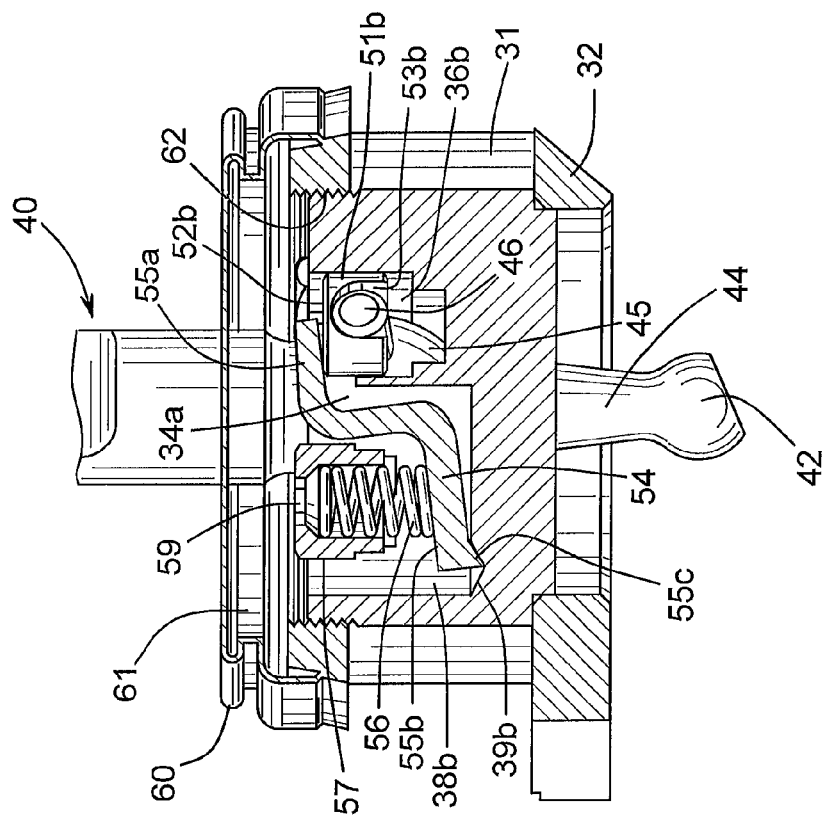
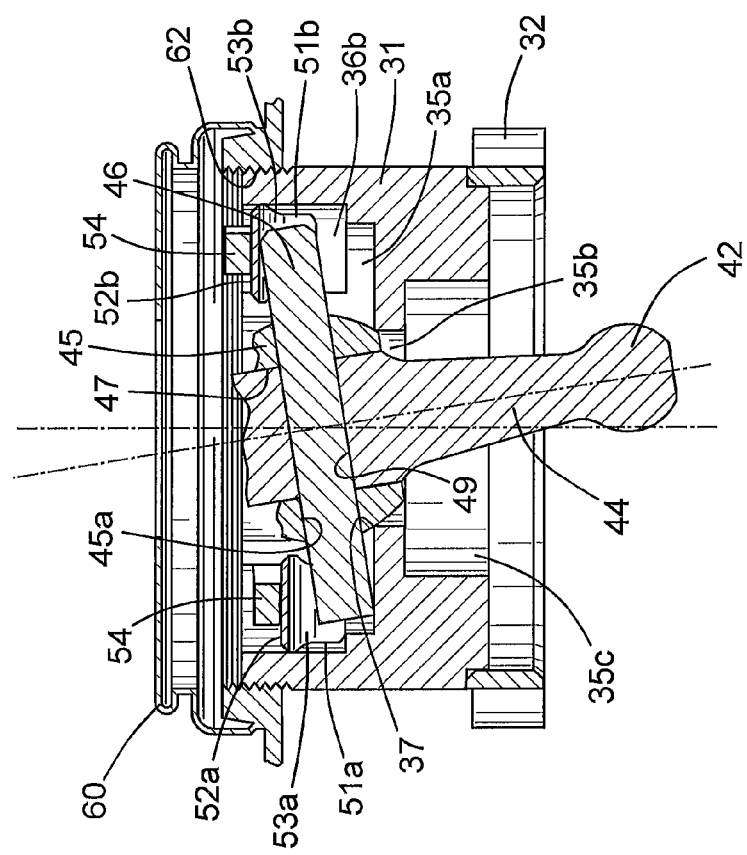

ADJUSTABLE SHIFT LEVER ASSEMBLY FOR A TRANSMISSION

CROSS-REFERENCE TO RELATED APPLICATIONS

This application claims the benefit of U.S. Provisional Application No. 61/011,162, filed Jan. 15, 2008, the disclosure of which is incorporated herein by reference.

BACKGROUND OF THE INVENTION

This invention relates in general to shift lever assemblies for transmissions, such as are commonly used in vehicular drive train systems. In particular, this invention relates to an improved structure for such a shift lever assembly that facilitates the adjustment of the amount of biasing force that is needed to move the shift lever when selecting various shift rail positions used in changing gear ratios in the transmission and reduces the amount of undesirable noise that is generated by the shift lever.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. The transmission of the engine/transmission assembly typically includes a case containing an input shaft, an output shaft, and a plurality of meshing gears. The meshing gears contained within the transmission case are of varying size so as to provide a plurality of gear ratios. By appropriately shifting among these various gear ratios, acceleration and deceleration of the vehicle can be accomplished in a smooth and efficient manner.

Many transmission structures are known in the art for shifting among these various gear ratios manually, i.e., in response to some physical exertion by the driver of the vehicle. In a conventional manual transmission, the driver grasps and moves an upper portion of a pivotable shift lever to effect shifting of the transmission. In response thereto, a lower portion of the shift lever engages and moves one of a plurality of shift rails provided within the transmission. The shift rails are typically supported within the transmission case for sliding movement from a central neutral position either forwardly to a first gear engaging position or rearwardly to a second gear engaging position. Thus, the initial selection and subsequent movement of a particular shift rail causes certain ones of the meshing gears to be connected between the input shaft and the output shaft. As a result, a desired gear ratio is provided between the input shaft and the output shaft.

Because of the interaction between the pivotable shift lever and the other components of the transmission, a certain amount of force is needed to move the shift lever between shift rail positions when changing gear ratios in the transmission. In order to accommodate the varying desires of different people who operate the transmission, it is desirable to be able to adjust the amount of force that is needed to move the shift lever between various shift rail positions when changing gear ratios in the transmission. This shift lever actuation force further may be responsive to a biasing force that is proportional thereto. This biasing force may further provide a return movement of the shift lever to a predetermined position relative to other transmission components. Additionally, it has been found that the transmission and other components of the drive train system generate noises and vibrations during operation. The shift lever can undesirably transmit these noises and vibrations to the area of the person who is operating the transmission. Thus, it would be desirable to provide an improved structure for a shift lever assembly that facilitates the adjustment of the amount of force that is needed to move the shift lever between various shift rail positions when changing gear ratios in the transmission. It would be further desirable to provide an improved shift lever assembly structure that reduces the amount of undesirable noise and vibration generated by the shift lever due to various excitation forces and structural resonances.

SUMMARY OF THE INVENTION

This invention relates to an improved structure for a shift lever assembly that facilitates the adjustment of the amount of biasing force that is needed to move the shift lever when selecting various shift rail positions used in changing gear ratios in the transmission and reduces the amount of undesirable noise that is generated by the shift lever. The shift lever assembly includes a shift tower and a shift lever supported on the shift tower for movement relative thereto. The shift lever includes a pin. A biasing lever is provided that has a first end and a second end. The second end of the biasing lever is engaged for movement with the pin. A biasing mechanism exerts a force against the first end of the biasing lever such that the second end of the biasing lever exerts a force against the pin. The biasing mechanism is adjustable such that the amount of force exerted by the second end of the biasing lever against the pin can be varied.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a sectional elevational view similar to FIG. 3 showing the shift lever assembly in an engaged position.

FIG. 6 is a sectional elevational view similar to FIG. 4 showing the shift lever assembly in an engaged position.

DETAILED DESCRIPTION OF THE PREFERRED EMBODIMENT

Figure 1:
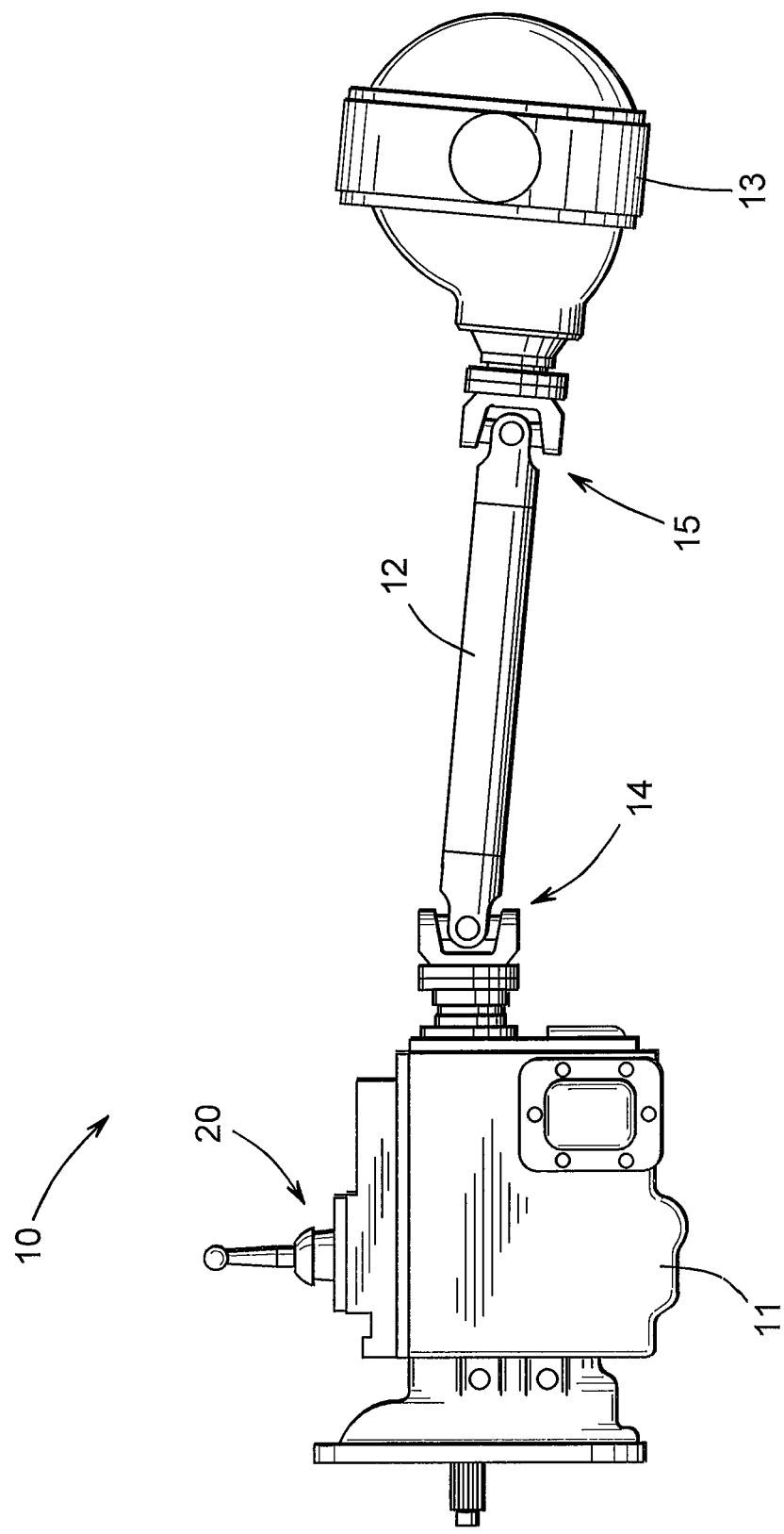
FIG. 1 is a side elevational view of drive train system including a transmission having a shift lever assembly in accordance with this invention.

Referring now to the drawings, there is illustrated in FIG. 1 a vehicle drive train system, indicated generally at 10, in accordance with this invention. The illustrated vehicle drive train system 10 is, in large measure, conventional in the art and is intended merely to illustrate one environment in which this invention may be used. Thus, the scope of this invention is not intended to be limited for use with the specific structure for the vehicle drive train system 10 illustrated in FIG. 1 or with vehicle drive train systems in general. On the contrary, as will become apparent below, this invention may be used in any desired environment for the purposes described below.

The illustrated drive train system 10 includes a transmission 11 having an output shaft (not shown) that is connected through a driveshaft 12 to an input shaft (not shown) of an axle assembly 13. The transmission 11 is rotatably driven by an engine (not shown) that generates rotational power in a conventional manner. The output shaft of the transmission 11 and the input shaft of the axle assembly 13 are typically not co-axially aligned. To accommodate this, a pair of universal joints, indicated generally at 14 and 15, are provided to respectively connect the end portions of the driveshaft tube 12 to the output shaft of the transmission 11 and to the input shaft of the axle assembly 13. As is well known, the first and second universal joints 14 and 15 provide a rotational driving connection from the output shaft of the transmission 11 through the driveshaft tube 12 to the input shaft of the axle assembly 13, while accommodating a limited amount of angular misalignment between the rotational axes of these three shafts.

A shift lever assembly, indicated generally at 20, is provided on the transmission 11 for shifting among the various gear ratios provided therein, as described above. The structure of the shift lever assembly 20 is illustrated in detail in FIG. 2. As shown therein, the shift lever assembly 20 includes a base, indicated generally at 30, a shift lever, indicated generally at 40, a biasing mechanism, indicated generally at 50, and a cover, indicated generally at 60. The base 30 includes a shift tower 31 and a cover plate 32. The shift tower 31 and the cover plate 32 may be formed as two separate components as illustrated. The shift tower 31 may be attached to the cover plate 32 by welding, adhesive bonding, threading, bolting, or any other attachment method. Alternatively, the shift tower 31 and cover plate 32 may be formed integrally from a single piece of material. The cover plate 32 may, as illustrated, have a plurality of attachment apertures 33 formed therethrough that can facilitate the securement of the shift tower 31 to the transmission 11.

Figure 2:
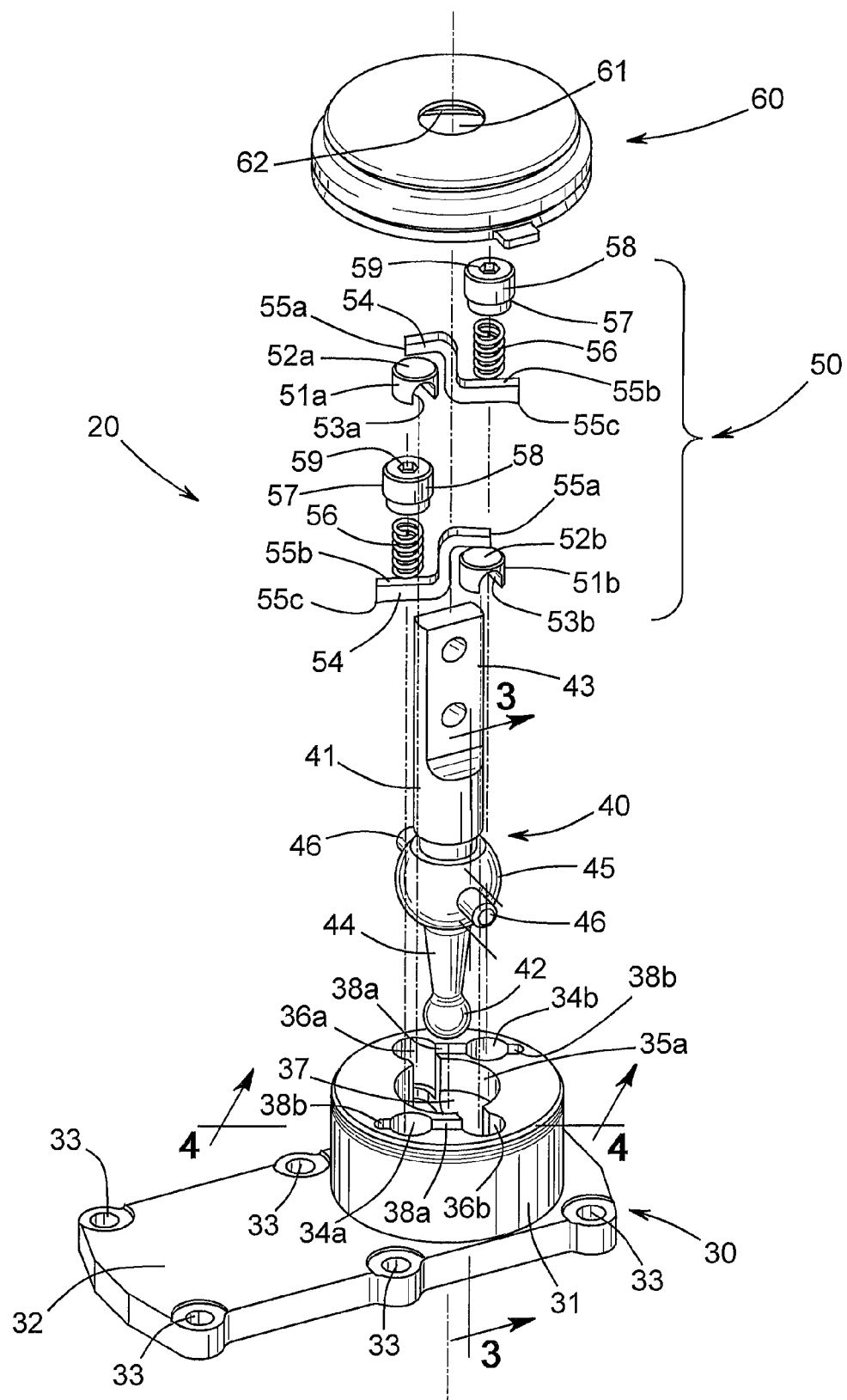
FIG. 2 is an enlarged exploded perspective view of the shift lever assembly illustrated in FIG. 1.
Figure 3:
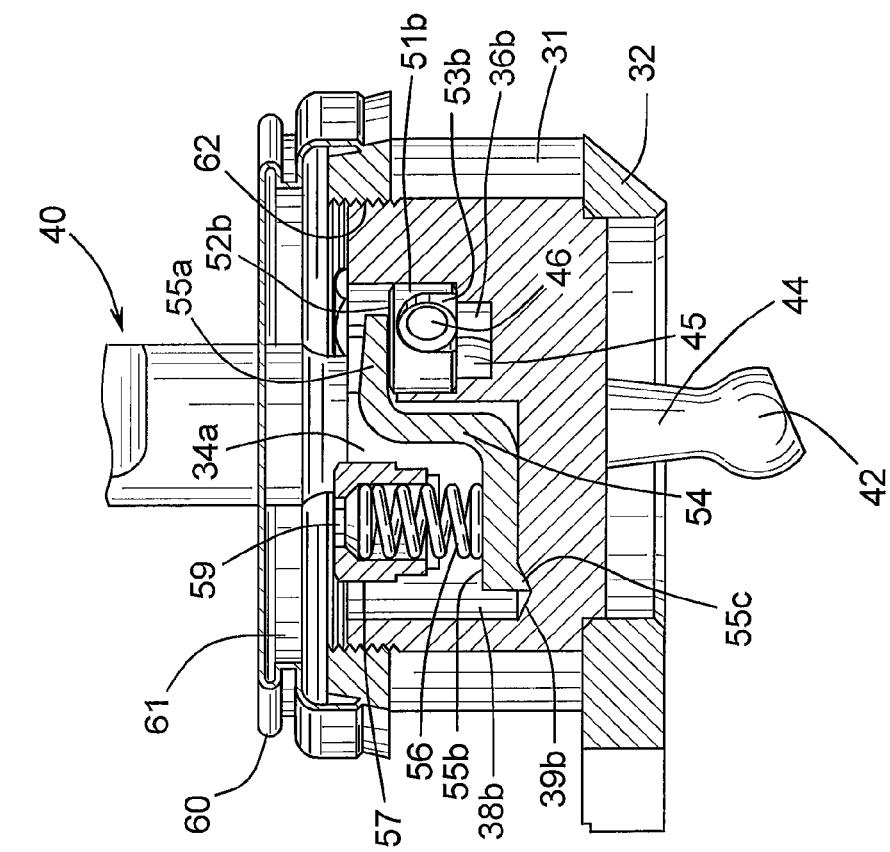
FIG. 3 is a further enlarged sectional elevational view of a portion of the shift lever assembly taken along line 3-3 of FIG. 2, wherein the shift lever assembly is shown in a neutral position.

As best shown in FIGS. 2, 3, and 5, the shift tower 31 has a first aperture 35a formed therein that extends downwardly from an upper end thereof to an internal seat 37. The illustrated seat 37 is generally spherical in shape and functions as a seating surface that locates a pivoting portion of the shift lever 40. However, the seat 37 may be formed having any desired shape that is capable of supporting a pivotable geometry, such as a shift lever with a spherically shaped or cylindrically shaped portion. The seat 37 may be a flat surface that is angled relative to the centerline of the first aperture 35a, such as for example a chamfered edge, or a curved surface having a mating spherical profile, though such is not required. A second aperture 35b and a counterbore 35c extend downwardly from the seat 37 to a lower end of the shift tower 31. The first and second apertures 35a and 35b and the counterbore 35c provide access through the shift tower 31 to a shift rail (not shown) or another shift actuating structure (not shown) that is provided beneath the lower end of the shift tower 31 within the transmission 11.

Figure 4:
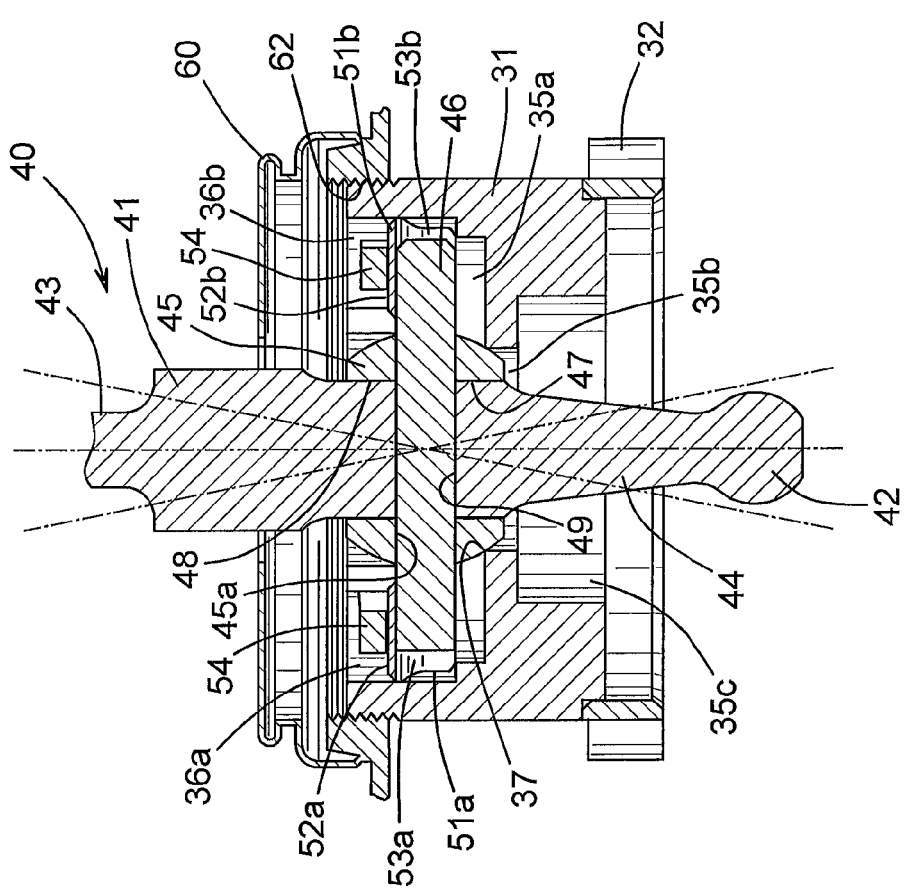
FIG. 4 is a further enlarged sectional elevational view of a portion of the shift lever assembly taken along line 4-4 of FIG. 3.

The shift tower 31 further includes first and second adjustment bores 34a and 34b that are located between the first aperture 35a and an outer circumferential surface of the shift tower 31. The adjustment bores 34a and 34b may include respective internally threaded portions, although such is not required. The shift tower 31 additionally includes first and second pin bores 36a and 36b that are also located between the first aperture 35a and an outer circumferential surface of the shift tower 31. The adjustment bores 34a and 34b communicate with the pin bores 36a and 36b by means of respective channels 38a and 38b. The channels 38 terminate in respective pivot sockets, one of which is shown at 39b in FIGS. 4 and 6. The channels 38a and 38b and the respective pivot sockets 39b may extend beyond the adjustment bores 34a and 34b as shown in FIGS. 2, 4, and 6, but such is not required. The pin bores 36a and 36b may be further positioned adjacent to the first aperture 35a and the seat 37 and have an access opening for communication therebetween. Alternatively, the adjustment bores 34a and 34b may be positioned co-axially to the pin bores 36 such that both bores are in communication with the first aperture 35a and the seat 37.

The shift lever 40 of the shift lever assembly 20 includes a first end 41, a second end 44, a fulcrum ball 45, and a fulcrum pin 46. The shift lever 40 further includes a pivot mounting section 48 and a pin mounting aperture 49 formed therethrough, as shown in FIGS. 3 and 5. The fulcrum ball 45 and fulcrum pin 46 are illustrated in FIGS. 3 and 5 as separate structures, although such is not required. The fulcrum ball 45 includes a mounting aperture 47 that engages the pivot mounting section 48 and a pin aperture 45a that is generally aligned with the pin mounting aperture 49 to engage the fulcrum pin 46. The fulcrum ball 45 and portions of the fulcrum pin 46 projecting therefrom may also be formed as integral sections of the shift lever 40, if so desired. Alternatively, the fulcrum pin 46 may be a pair of fulcrum pins 46 locating in the pin mounting aperture 49 and projecting outwardly therefrom.

The first end 41 of the shift lever 40 terminates in a handle attachment portion 43. Though illustrated as having two mounting apertures formed therethrough, such is not required. The handle attachment portion 43 may alternatively be a threaded end, a knurled section, a smooth region, or any other configuration that may engage a handle (not shown) or knob (not shown). The second end 44 of the shift lever 40 terminates in a pivot ball 42 that is adapted to engage a shift rail (not shown) provided within the transmission 11, as described above. The pivot ball 42 is illustrated as an integral part of the shift lever 40, though such is not required. The pivot ball 42 may be a separate structure that is connected to the shift lever 40, for example by threading, bolting, screwing, adhesive bonding, welding and the like if so desired. The pivot ball 42 may alternatively be other than illustrated, such as a pair of opposed flat faces with an aperture formed therethrough, a threaded bore, or threaded stud projecting therefrom to operatively engage a linkage structure (not shown) if so desired. The shift lever 40, including the fulcrum ball 45 and the fulcrum pin 46, is supported on the shift tower 31 in such a manner as to permit pivoting motion of the shift lever 40 relative to the shift tower 31. To accomplish this, the fulcrum ball 45 pivots relative to the seat 37 when the handle attachment portion 43 is articulated. The second end 44 of the shift lever 40 extends through the second aperture 35b and a counterbore 35c, as shown in FIGS. 3 and 5, in order to engage and move the shift rail when the handle attachment portion 43 is articulated.

The biasing mechanism 50 of the shift lever assembly 30 includes first and second biasing lever seats 51a and 51b, each having a biasing lever face 52a and 52b and a pin groove 53a and 53b. The biasing lever seats 51a and 51b are respectively supported within the pin bores 36a and 36b of the shift tower 31 for sliding movement relative thereto, as illustrated in FIGS. 4 and 6. With the shift lever 40 engaged into the shift tower 31, the pin grooves 53a and 53b respectively engage the opposed portions of the fulcrum pin 46 extending radially from the fulcrum ball 45 into the pin bores 36a and 36b. The biasing lever seats 51a and 51b may be made from any desired material including metals, such as steel, aluminum, bronze, and the like, and may be in a monolithic form or as a sintered structure if so desired. Alternatively, the biasing lever seats 51a and 51b may be made from a plastic, composite, or polymer material, such as for example, nylon, polyamide-imide, polyethylene, and the like if so desired.

The biasing mechanism 50 further includes first and second biasing levers 54, respective resilient members 56, and respective biasing screws 57. Each of the biasing levers 54 includes a first end 55a that engages the biasing lever face 52 of the biasing lever seat 51 in order to apply a load between the fulcrum pin 46 and the pin groove 53. Each of the biasing levers 54 further includes a second end 55b that engages the associated resilient member 56 and a pivot edge 55c that is positioned in the associated pivot socket 39b of the channel 38a and 38b. Although the biasing levers 54 are illustrated as having a generally "Z" shape, such is not required. The biasing levers 54 may alternatively be formed in a shape other than illustrated, for example an "S" shape, a straight bar or rod shape, and the like if so desired. The biasing levers 54 may be formed from any desired material including metals, such as for example steel, aluminum, titanium, and the like. Alternatively, the biasing levers 54 may be formed from a resin material and may further include fiber reinforcement if so desired. The illustrated pivot edges 55c shown in FIGS. 4 and 6 are protrusions having an inclined surface, although such is not required. If provided, the protrusions may have any desired shape, such as hemispherical, semi-cylindrical, square, rectangular, triangular and the like. The interaction of the pivot edges 55c and the pivot sockets 39b prevents relative axial movement of the biasing levers 54 toward the biasing mechanism 50, which might cause binding of the biasing mechanism 50 and, as a consequence, undesirable inhibiting of the movement of the shift lever assembly 20. In an alternative configuration, the pivot edges 55c may be pinned or otherwise axially fixed to the area of the pivot socket 39b. Such an axially fixed arrangement may be a roll pin (not shown) projecting upward from the area of the pivot socket 39b and engaging a mating slot formed in the area of the pivot 55c. Alternatively, the pivot edges 55c may be geometrically shaped ends of the biasing levers 54, such as for example a triangular end configuration, engaged in correspondingly shaped recesses formed into the adjustment bores 34a and 34b or portions thereof.

The resilient members 56 are shown as coil springs, but may be other than illustrated if so desired. The resilient members 56 may alternatively be formed as, for example, elastomeric cylinders, elastomeric resilient members having a slot to generate a shear-oriented load, "C" springs, integral C-spring and lever structures, or any other elastically deformable shape or shapes that are suitable for generating a variable load output in response to a deflection input. In an alternative embodiment, the biasing mechanism 50 may include the respective biasing lever seats 51a and 51b having the resilient members 56 locating on the biasing lever faces 52a and 52b or as an integral part thereof.

Each of the biasing screws 57 includes an outer surface 58 and an adjustment feature 59. The outer surfaces 58 respectively engage the inner surfaces of the adjustment bores 34 to selectively fix the location of the associated biasing screws 57 relative to the adjustment bores 34a and 34b. To accomplish this, the outer surfaces 58 may include screw threads that engage corresponding mating threads formed within the adjustment bores 34a and 34b, if so desired. The adjustment features 59 may be a hex-drive, as illustrated in FIG. 2, or may be any other feature that facilitates selective movement of the biasing screws 57 relative to the adjustment bores 34a and 34b. Alternatively, the outer surfaces 58 may have profiles formed thereon for stepped engagement with correspondingly formed inner surfaces of the adjustment bores 34a and 34b. The outer surfaces 58 may be smooth and the biasing screws 57 adjustably engaged to the shift tower 31 by screws or bolts that may extend though the resilient members 56. Each of the outer surfaces 58 may also include a pair of locking surfaces that expand to engage the inner surfaces of the adjustment bores 34, such as spring ball quick release structures that are known in the art, if so desired. The adjustment features 59 may also be pin structures such that actuation of the pins may release the locking surfaces. The biasing screws 57 may be made from a metal, a plastic, or any such material suitable for such a fastener.

With the shift lever 40, the fulcrum ball 45, the fulcrum pin 46, and the biasing lever seats 51 engaged within the shift tower 31, as illustrated in FIG. 4 and described above, the biasing levers 54 may be located in the channels 38a and 38b. The first ends 55a of the biasing levers 54 engage the biasing lever faces 52 of the biasing lever seats 51 located in the pin bores 36a and 36b. The pivot edges 55c of the biasing levers 54 are located at the bottoms of the channels 38a and 38b. The resilient members 56 are disposed between the second ends 55b of the biasing levers 54 and the biasing screws 57. As the biasing screws 57 are advanced into the adjustment bores 34a and 34b, the resilient members 56 are compressed, thus exerting loads on the second ends 55b of the biasing levers 54. The first ends 55a of the biasing levers 54 transfer the load to the biasing lever faces 52 of the biasing lever seats 51. The pin groove 53 of the anti-vibration biasing lever seats 51 bear down on the surfaces of the fulcrum pins 46. As the biasing screws 57 are retracted from the adjustment bores 34a and 34b, the resilient members 56 are expanded, resulting in a reduced load applied to the second ends 55b of the biasing levers 54. Thus, the biasing screws 57 function to apply an adjustable amount of force against the second ends 55b of the biasing levers 54. Any other desired structure can be used to exert this adjustable amount of force against the second ends 55b of the biasing levers 54. Thus, as used herein, the term "biasing mechanism" is intended to include any structure or combination of structures that is capable of exerting an adjustable amount of force against the second ends 55b of the biasing levers 54.

The cover 60 engages the shift tower 31 to seal the biasing mechanism 50, the fulcrum ball 45, and the fulcrum pin 46 of the shift lever 40 from contamination. The cover 60 may also be releasable to provide access to the biasing screws 57 for adjusting the shifter actuation force. The cover 60 includes a shift lever aperture 61, in order to expose the handle attachment portion 43, and an internal securing structure 62. Though illustrated in FIGS. 3 through 6 as threading onto the shift tower 31, the cover 60 may be attached in any manner such as, for example, bolting, screwing, press fit, snap fit, and the like if so desired. The cover 60 may be made from a metal, a plastic, or an elastomer and further may be in the form of a cap, as illustrated in FIG. 2, a boot, convoluted diaphragm, or other such shape to engage and seal the shift tower 31, the shift lever 40, and the biasing mechanism 50.

FIGS. 5 and 6 illustrate the shift lever 40 in an articulated position within the shift tower 31 to selectively engage a desired gear ratio. As shown in FIG. 5, the shift lever 40 is articulated through swiveling of the fulcrum ball 45 on the seat 37 such that the fulcrum pin 46 moves one of the biasing lever seats 51 within the associated pin bore 36. The biasing lever face 52 pushes against the first end 55a of the biasing lever 54, causing the pivot edge 55c to pivot in the pivot socket 39b. As shown in FIG. 6, the second end 55b of the biasing lever 54 compresses the resilient member 56, which creates a reactive force that is transmitted back to the fulcrum pin 46 and the fulcrum ball 45. The applied force, coupled with a coefficient of friction between swiveling and pivoting interfaces of the fulcrum ball 45 and the fulcrum pin 46 and mating surfaces, provides a resistance to movement creating an operative feel or tactile sensation when the shift lever 40 is actuated. The biasing screw 57 may be advanced into the adjustment bore 34 to increase the compression of the resilient member 56 in order to transmit a larger force and generate a larger resistance to movement. The resistance to movement further provides a force dampening and clamping mechanism to reduce or eliminate vibrations transmitted by the shift lever 40.

When the invention is applied to a conventional manual transmission, FIG. 4 illustrates a typical neutral position, wherein no gear location (or possibly no shift rail position) is operatively selected. The force damping and clamping operation of the biasing mechanism 50 is further operative when the shift lever 40, including the fulcrum pin 46, is articulated into the neutral position. The biasing levers 54 continue to apply a force onto the biasing lever faces 52 of the biasing lever seats 51, which clamps the fulcrum ball 45 onto the seat 37 thus reducing or eliminating vibrations transmitted by the shift lever 40. The biasing mechanism 50, when provided as a pair of opposed-acting biasing assemblies as illustrated in FIGS. 3 and 5, may generate a neutral restoring force. The neutral restoring force causes the shift lever 40 to seek an equilibrium position thus balancing the biasing forces of the biasing mechanism 50. The biasing mechanism 50 may be adjusted to produce the same load onto each side of the fulcrum ball 45 to maintain a centered neutral position when the shift lever 40 is released. Alternatively, the biasing mechanism 50 may be embodied as only a single one of the biasing assemblies shown in the drawings.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A shift lever assembly comprising:
a shift tower;
a shift lever supported on the shift tower for movement relative thereto, the shift lever including a pin;
a biasing lever having a first end and a second end, the second end of the biasing lever being engaged for movement with the pin; and
a biasing mechanism exerting a force against the first end of the biasing lever such that the second end of the biasing lever exerts a force against the pin, wherein the biasing mechanism is manually adjustable such that an amount of force exerted by the second end of the biasing lever against the pin is variable.

2. The shift lever assembly defined in claim 1 wherein the shift tower has a pin bore provided therein, and wherein the pin extends within the pin bore.

3. The shift lever assembly defined in claim 1 wherein the shift tower has an adjustment bore provided therein, and wherein the biasing mechanism is disposed within the adjustment bore.

4. The shift lever assembly defined in claim 1 wherein the shift tower has a pin bore and an adjustment bore provided therein, the pin extends within the pin bore, and the biasing mechanism is disposed within the adjustment bore.

5. The shift lever assembly defined in claim 1 wherein the shift tower has a pin bore, an adjustment bore, and a channel that extends between the pin bore and the adjustment bore provided therein, and wherein the pin extends within the pin bore, the biasing mechanism is disposed within the adjustment bore, and the biasing lever extends from the pin bore to the adjustment bore.

6. The shift lever assembly defined in claim 1 wherein the biasing lever is generally Z-shaped.

7. The shift lever assembly defined in claim 1 wherein the biasing mechanism includes a resilient member that exerts the force against the first end of the biasing lever.

8. The shift lever assembly defined in claim 1 wherein the biasing mechanism further includes a biasing screw and a resilient member that reacts between the biasing screw and the biasing lever.

9. The shift lever assembly defined in claim 8 wherein the biasing screw is adjustably supported on the shift tower.

10. The shift lever assembly defined in claim 8 wherein the biasing screw is threaded into an adjustment bore provided in the shift tower.

11. A shift lever assembly comprising:
a shift tower;
a shift lever supported on the shift tower for movement relative thereto, the shift lever including first and second pins;
first and second biasing levers, each having a first end and a second end, the second ends of the first and second biasing levers being respectively engaged for movement with the first and second pins; and
first and second biasing mechanism exerting respective forces against the first ends of the first and second biasing levers such that the second ends of the first and second biasing levers exert respective forces against the first and second pins, wherein the first and second biasing mechanisms are each manually adjustable such that amounts of force exerted by the second ends of the first and second biasing levers against the first and second pins are variable.

12. The shift lever assembly defined in claim 11 wherein the shift tower has first and second pin bores provided therein, and wherein the first and second pins respectively extend within the first and second pin bores.

13. The shift lever assembly defined in claim 11 wherein the shift tower has first and second adjustment bores provided therein, and wherein the first and second biasing mechanisms are respectively disposed within the first and second adjustment bores.

14. The shift lever assembly defined in claim 11 wherein the shift tower has first and second pin bores and first and second adjustment bores provided therein, the first and second pins respectively extend within the first and second pin bores, and the first and second biasing mechanisms are respectively disposed within the first and second adjustment bores.

15. The shift lever assembly defined in claim 11 wherein the shift tower has first and second pin bores, first and second adjustment bores, and first and second channels that respectively extend between the first and second pin bores and the first and second adjustment bores provided therein, and wherein the first and second pins extend respectively within the first and second pin bores, the first and second biasing mechanisms are respectively disposed within the first and second adjustment bores, and the first and second biasing levers respectively extend from the first and second pin bores to the first and second adjustment bores.

16. The shift lever assembly defined in claim 11 wherein each of the first and second biasing mechanisms includes a resilient member that exerts the force against one of the first ends of the biasing levers.

17. The shift lever assembly defined in claim 11 wherein each of the first and second biasing mechanisms further includes a biasing screw and a resilient member that reacts between the biasing screw and the biasing levers.

18. The shift lever assembly defined in claim 17 wherein each biasing screw is adjustably supported on the shift tower.

19. The shift lever assembly defined in claim 17 wherein each biasing screw is respectively threaded into one of the first and second adjustment bores provided in the shift tower.

20. A shift lever assembly comprising:
a shift tower;
a shift lever supported for movement relative to the shift tower;
a biasing lever that cooperates with the shift lever such that movement of the shift lever relative to the shift tower causes movement of the biasing lever; and
a biasing mechanism that exerts a force against the biasing lever such that the biasing lever exerts a force against the shift lever that resists movement of the shift lever relative to the shift tower, wherein the biasing mechanism includes a manually adjustable for varying structure that the amount of the force against the shift lever that resists movement of the shift lever relative to the shift tower.

\* \* \* \* \*